US011068129B2

(12) United States Patent
Rose et al.

(10) Patent No.: US 11,068,129 B2
(45) Date of Patent: Jul. 20, 2021

(54) METHOD AND DEVICE FOR AUGMENTING A COMMUNAL DISPLAY DEVICE

(71) Applicant: Lenovo (Singapore) Pte. Ltd., New Tech Park (SG)

(72) Inventors: Alden Dixon Rose, Durham, NC (US); Aaron Michael Stewart, Raleigh, NC (US); Hallie Elizabeth Clark MacEldowney, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 16/545,134

(22) Filed: Aug. 20, 2019

(65) Prior Publication Data

US 2021/0055837 A1 Feb. 25, 2021

(51) Int. Cl.
*G06F 3/0482* (2013.01)
*G06F 3/0484* (2013.01)
*G06F 9/445* (2018.01)

(52) U.S. Cl.
CPC .......... *G06F 3/0482* (2013.01); *G06F 3/0484* (2013.01); *G06F 9/445* (2013.01)

(58) Field of Classification Search
CPC ...... G06F 3/0482; G06F 3/0484; G06F 9/445; G09B 7/00–12
See application file for complete search history.

(56) References Cited

U.S. PATENT DOCUMENTS

| | | | | |
|---|---|---|---|---|
| 2009/0232291 | A1* | 9/2009 | Prabhune | H04M 3/56 379/202.01 |
| 2009/0244278 | A1* | 10/2009 | Taneja | H04N 7/147 348/143 |
| 2010/0060803 | A1* | 3/2010 | Slack | H04N 7/15 348/744 |
| 2011/0216060 | A1* | 9/2011 | Weising | G06F 3/0346 345/419 |
| 2011/0222676 | A1* | 9/2011 | Okada | H04N 7/147 379/93.21 |
| 2014/0047339 | A1* | 2/2014 | Epstein | G06F 3/023 715/719 |
| 2014/0146200 | A1* | 5/2014 | Scott | G06K 9/34 348/231.99 |
| 2014/0208211 | A1* | 7/2014 | Luo | G06Q 10/10 715/730 |
| 2014/0333509 | A1* | 11/2014 | Yuann | G06F 1/1626 345/2.1 |

(Continued)

*Primary Examiner* — Nicholas Klicos
(74) *Attorney, Agent, or Firm* — The Small Patent Law Group LLC; Dean D. Small

(57) ABSTRACT

A computer implemented method and device for augmenting a communal display device (CDD) are provided. The method includes, under control of one or more processors configured with specific executable program instructions, capturing CDD image data at a digital camera unit (DCU) of a client device. The CDD image data is indicative of an image presented on the CDD. The method displays the CDD image data on a display of the client device and processes the CDD image data to determine interactive regions associated with the image presented on the CDD. The method generates an instruction in response to a user-based selection on the client device of at least one of the interactive regions and transmits the instruction to one or more processors associated with the CDD.

20 Claims, 7 Drawing Sheets

(56) References Cited

U.S. PATENT DOCUMENTS

| | | | |
|---|---|---|---|
| 2014/0344420 A1* | 11/2014 | Rjeili | H04L 67/10 |
| | | | 709/220 |
| 2016/0119314 A1* | 4/2016 | Uzelac | H04L 63/0807 |
| | | | 726/6 |
| 2016/0253048 A1* | 9/2016 | Silcock | G06Q 10/02 |
| | | | 715/753 |
| 2017/0006162 A1* | 1/2017 | Bargetzi | H04W 4/06 |
| 2017/0116784 A1* | 4/2017 | Hintermeister | G06K 9/00671 |
| 2017/0357915 A1* | 12/2017 | Holmes | G06F 3/04883 |
| 2018/0359106 A1* | 12/2018 | Moorefield, Jr. | H04L 12/1813 |
| 2020/0334055 A1* | 10/2020 | Cho | G06F 16/9035 |
| 2021/0042724 A1* | 2/2021 | Rathod | G06Q 30/06 |

* cited by examiner

METHOD AND DEVICE FOR AUGMENTING A COMMUNAL DISPLAY DEVICE

BACKGROUND

Embodiments herein generally relate to methods and systems for augmenting a communal display device.

Electronic communal display devices are common in public areas and may take the form of a wall-mounted touchscreen device, a computer kiosk, or the like. Communal display devices may show content, such as text, video, images, graphics, and the like, useful to a user. Communal display devices may also allow a user to enter information and perform actions (e.g., book a conference room, select menu items, and the like). A user at a communal display device may enter information and/or instructions and the display may change based on the entered information and/or instructions. However, such communal display devices typically accommodate a single user at a time, so the number of users that can interact with a given communal display device is limited. Moreover, such communal display devices do not interact with or accept input from other computing devices associated with users of the communal display devices.

With the increasing sophistication and functionality of mobile computing devices, there exists a need for enhanced interactions with communal display devices that allow multiple users to interact with a given communal display device contemporaneously and that provide for personalization of content of the communal display device based on user identity and/or user input.

SUMMARY

In accordance with embodiments herein, a computer implemented method for augmenting a communal display device (CDD) is provided. The method includes, under control of one or more processors configured with specific executable program instructions, capturing CDD image data at a digital camera unit (DCU) of a client device. The CDD image data is indicative of an image presented on the CDD. The method displays the CDD image data on a display of the client device and processes the CDD image data to determine interactive regions associated with the image presented on the CDD. The method generates an instruction in response to a user-based selection on the client device of at least one of the interactive regions and transmits the instruction to one or more processors associated with the CDD.

Optionally, the method may identify the user-based selection based on one or more of touch, proximity sensing, gesture or computer vision. The displaying may include presenting, as the CDD image data, a first content screen. The method may update the display of the client device to display a second content screen in response to the user-based selection. The method may provide unique credentials associated with one or more of the client device and a user of the client device. The method may receive a data set that corresponds to a select group of one or more users that includes the one or more of the client device and the user of the client device, based on the unique credentials.

Optionally, the method may implement a client application corresponding to a host application maintained on the CDD to manage resources. The method may receive, at the client device, a data set transmitted from the CDD. The data set may designate resources reserved by other clients. The method may utilize the client application, data set and user-based selection to generate a request to designate an available resource from the resources. The method may transmit the request to the one or more processors associated with the CDD. The data set may correspond to a select group of one or more users that includes a user of the client device.

Optionally, the CDD may implement an application for managing resources. The application may include application specific instructions that define a framework for a collection of content screens for designating the resources. The CDD may maintain a data set that tracks designations of the resources by other clients. The instruction may represent a request to designate an available resource from the resources. The method may overlay, on the CDD image data, user specific content that is determined based on a user unique identifier. The capturing, displaying, processing, generating, and transmitting may be performed in parallel for at least first and second client devices in connection with different first and second user-based selections.

In accordance with embodiments herein, a computer implemented method for augmenting a communal display device (CDD) is provided. The method includes, under control of one or more processors configured with specific executable program instructions, identifying a host application maintained on a CDD to manage resources. The method implements a client application corresponding to the host application. The method receives, at the client device, a data set transmitted from the CDD. The data set designates resources reserved by other clients. The method utilizes the client application, data set and user-based selection to generate a request to designate an available resource from the resources. The method transmits the request to the one or more processors associated with the CDD.

Optionally, the data set may correspond to a select group of one or more users that includes a user of the client device. The method may include providing unique credentials associated with one or more of the client device and a user of the client device. The method may receive a data set that corresponds to a select group of one or more users that includes the one or more of the client device and the user of the client device, based on the unique credentials. As part of the utilize, the method may display the CDD image data on a display of the client device and overlay, on the CDD image data, content that is based on the data set that corresponds to the select group of one or more users. As part of the utilize, the method may identify the user-based selection based on one or more of touch, proximity sensing, gesture or computer vision. The identifying, implementing, receiving, utilizing, and transmitting may be performed in parallel for at least first and second client devices in connection with different first and second user-based selections.

In accordance with embodiments herein, a device for augmenting a communal display device (CDD) is provided. The device includes one or more processors, a digital camera unit (DCU), a display and memory storing program instructions accessible by the one or more processors. Responsive to execution of the program instructions, the one or more processors perform an image capture operation to capture CDD image data at the DCU in response to a user-based image capture instruction. The CDD image data is indicative of an image presented on the CDD. The one or more processors process the CDD image data to determine interactive regions associated with the image presented on the CDD. The one or more processors display the CDD image data on the display. The one or more processors generate an instruction in response to a user-based selection of at least one of the interactive regions. The one or more processors transmit the instruction to one or more processors associated with the CDD.

Optionally, the one or more processors may identify the user-based selection based on one or more of touch, proximity sensing, gesture, or computer vision. The one or more processors, as part of the display, may present, as the CDD image data, a first content screen. The one or more processors may update the display to display a second content screen in response to the user-based selection. The one or more processors may transmit unique credentials associated with one or more of the device or a user of the device and, based thereon, may receive a data set that corresponds to a select group of one or more users that includes one or more of the device or a user of the device. The one or more processors may implement a client application corresponding to a host application maintained on the CDD to manage resources. The one or more processors may receive, at the client device, a data set transmitted from the CDD. The data set may designate resources reserved by other clients. The one or more processors may utilize the client application, data set and user-based selection to generate a request to designate an available resource from the resources. The one or more processors may transmit the request to the one or more processors associated with the CDD

DETAILED DESCRIPTION

Figure 1:
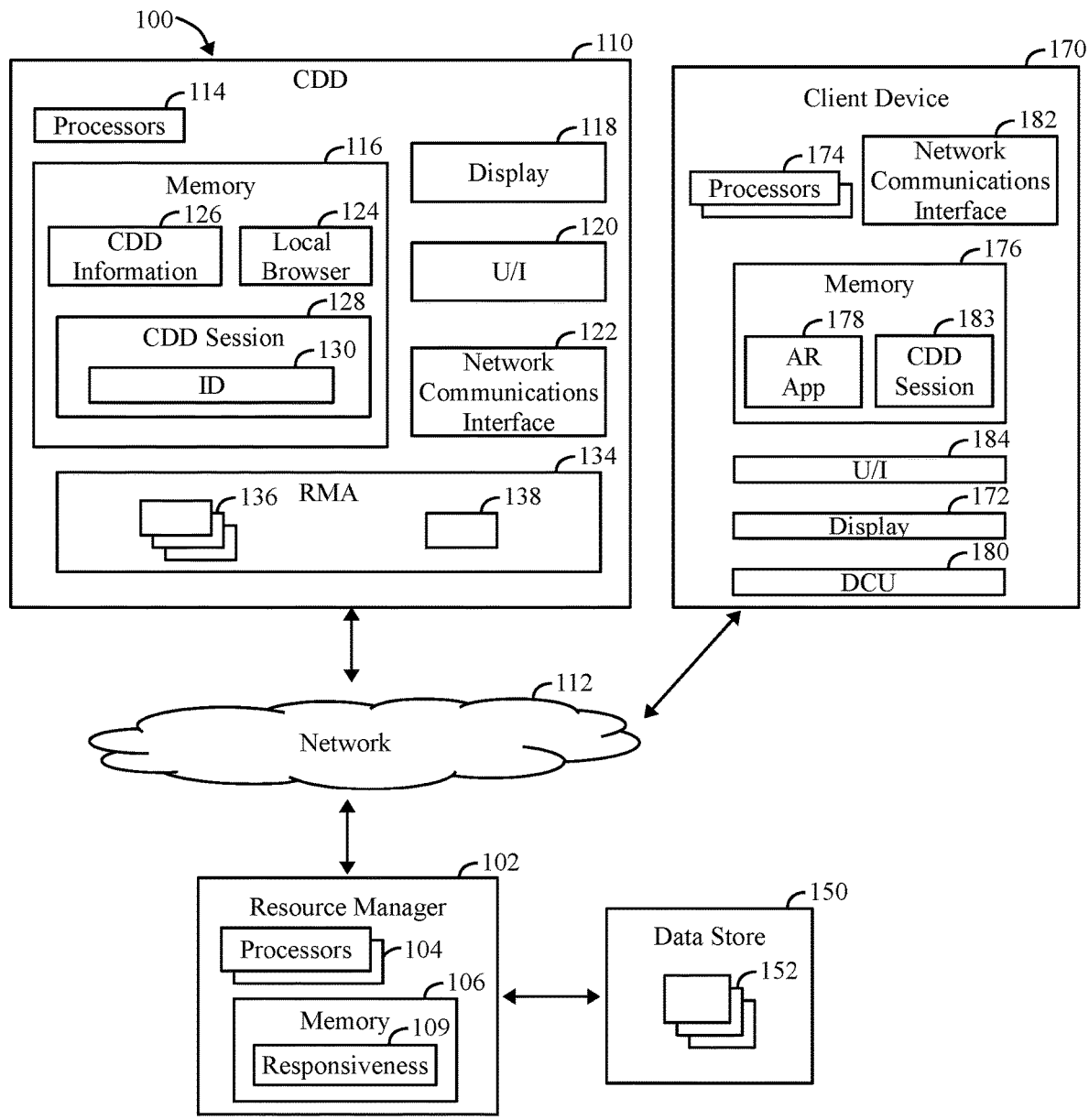
FIG. 1 illustrates a system to augment a communal display device implemented in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Terms

The terms "communal display device" and "CDD" refer to a public and/or shared information display device that includes a first content screen displayed to all users and that implements, as a host application, a resource management application (RMA). The RMA includes application specific instructions that define a framework for a collection of content screens for designating the resources and the RMA maintains a data set that tracks designations of the resources by one or more client devices and/or users associated with the CDD and/or a shared network associated with the CDD and the one or more client devices and/or users. Examples of shared displays include information kiosks (e.g., information kiosks located in public spaces such as malls, museums, airports, offices, hospitals, and the like, that display public content such as maps, room location info-graphics, menus, lists, schedules, advertisements, resources, and the like), electronic notice boards, movie theater screens, meeting room projection screens, and large outdoor displays as can be found in sports stadiums and public squares. Further examples of shared displays include shared displays for an audience implemented in conferences, conventions, talks and demonstrations; shared displays for customers implemented in retail establishments, such as restaurants, coffee shops, shoe stores, clothing stores, and the like; and shared displays implemented by advertisers in public spaces as a way to host ads with richer media content.

The term "client device" refers to any mobile computing device that supports augmented reality (or mixed reality) interaction. Mobile computing devices that support mixed and/or augmented reality interaction include one or more cameras (e.g., digital camera units (DCUs)), a display, and an input interface, and have on-board computer vision capabilities. Examples of client devices include smartphones, tablet devices, head mounted display devices, smart watches, laptop computers, and the like.

The term "resources" refers to a supply and/or availability of an asset. Examples of resources include physical meeting spaces, a virtual meeting spaces, items on a menu or in a catalog, events, services, and the like.

The terms "designating" and "designate" refers to selecting, setting apart, or otherwise appointing one or more resources from a collection of resources. For example, designating may include booking a room, setting up a conference room and/or call, selecting menu items, selecting catalog items, registering for an event, booking a service, and the like.

The term "obtains" and "obtaining", as used in connection with data, signals, information and the like, include at least one of i) accessing memory of a CDD, client device or resource manager where the data, signals, information, etc. are stored, ii) receiving the data, signals, information, etc. over a wireless communications link between the CDD, client device, and a resource manager, and/or iii) receiving the data, signals, information, etc. at a resource manager over a network connection. The obtaining operation, when from the perspective of a CDD, may include sensing new signals in real time, and/or accessing memory to read stored data, signals, information, etc. from memory within the CDD. The obtaining operation, when from the perspective of a client device, includes receiving the data, signals, information, etc. at a transceiver of the client device where the data, signals, information, etc. are transmitted from a CDD and/or a resource manager. The obtaining operation may be from the perspective of a resource manager, such as when receiving the data, signals, information, etc. at a network interface from a client device and/or directly from a CDD. The resource manager may also obtain the data, signals, information, etc. from local memory and/or from other memory, such as within a cloud storage environment and/or from the memory of a remote device.

System Overview

FIG. 1 illustrates a system 100 implemented in accordance with embodiments herein to augment communal display devices. Augmenting communal display devices may include enabling multiple users to interact with a given communal display device on their respective client devices contemporaneously and/or providing personalization of content on a client device based on user identity and/or input. The system 100 includes one or more resource managers 102 that manage and otherwise provide access to one or more data stores 150 that store network resources 152. The resource manager 102 communicates with client devices 110 and remote devices 170 through one or more networks 112 to provide access to the network resources 152. The network 112 may represent the World Wide Web, a local area network, a wide area network and the like. The CDD 110 may represent various types of electronic devices including, but not limited to, servers, computer networks, workstations, data centers, cloud computing systems, smart phones, desktop or laptop computers, tablet devices or other network-based computing environments. The client device 170 may represent various types of electronic devices including, but not limited to, smart phones, desktop or laptop computers, tablet devices, head-mounted display devices, other network-based computing devices, and the like. The client device 170 may represent a single computer system or a collection of computer systems located at a common location or geographically distributed. The resource manager 102 may represent a server or other network-based computing environment. The resource manager 102 may represent a single computer system or a collection of computer systems located at a common location or geographically distributed.

The resource manager 102 includes one or more processors 104 and memory 106, among other structures that support operation of the resource manager 102. The memory 106 includes an operating system, instructions to manage the data store 150 and instructions to implement the methods described herein.

The data store 150 may store the network resources 152 organized in various manners and related to a wide variety of topics and content. As non-limiting examples, collections of network resources 152 may be organized and maintained in connection with data bases, websites, webpages, blogs, social media and the like. The network resources 152 may be organized and maintained within any manner of data sources, such as data bases, text files, data structures, libraries, relational files, flat files and the like.

The resource manager 102 may receive requests from various CDDs 110 and/or client devices 170 and return network responsive resources 109 in connection therewith. It is recognized that the resource manager 102 performs other operations, not described herein, such as operations associated with maintaining resources and the like. The resource manager 102 may enable interaction with a given CDD 110 on a respective client device 170 and/or providing a user-specific view on a client device 170 based on unique user credentials. Optionally, the resource manager 102 may maintain a collection of information related to unique user credentials for multiple prior CDD sessions. For example, the collection of information related to unique user credentials may include information related to past CDD sessions that are recorded by the resource manager 102. Additionally or alternatively, the information related to past CDD sessions may be recorded by corresponding CDDs 110 and then conveyed to the resource manager 102 in order to be maintained in the collection in the memory 106 of the resource manager 102. As one example, the information related to past CDD sessions corresponding to unique user credentials may be maintained in a database or other file structure.

The CDD 110 includes one or more processors 114, memory 116, a display 118, a user interface 120, a network communications interface 122, and various other mechanical components, electrical circuits, hardware and software to support operation of the CDD 110. The memory 116 includes an operating system and instructions to implement the processes described herein. The memory 116 also stores one or more application programs, such as the resource management application (RMA) 134, to implement a browser 124 corresponding to a CDD session, as well as other software, information and data as described herein. The RMA 134 includes specific instructions that define a framework for a collection of content screens 136 for designating the resources and maintains a data set 138 that tracks designations of the resources by one or more client devices 170 and/or users associated with the CDD 110. In accordance with embodiments herein, the processors 114 determine and update collections of content screens 136 and data sets 138 session when a CDD session is first initiated and/or continuously throughout. The CDD information 126 is indicative of various characteristics of a CDD session experienced by the browser 124 on one or more of the CDD 110 itself or client devices 170 on the shared network 112. The memory 116 maintains the CDD information 126. The image presented on the display 118 of the CDD 110 may be a first content screen. The first content screen may display an introductory (or public) content view. The introductory content view is not specific to any client device 170 and/or any user of the client device 170. The introductory content view includes one or more interactive regions organized in a select layout. The introductory content view may contain introductory maps, room location infographics, menus, lists, schedules, advertisements, resources, and the like.

The client device 170 includes one or more processors 174, memory 176, a display 172, a user interface 184, a network communications interface 182, a DCU 180, and various other mechanical components, electrical circuits, hardware and software to support operation of the client device 170. The memory 176 includes an operating system and instructions to implement the processes described herein. The memory 176 also stores one or more application programs, such as the augmented reality (AR) application 178, to implement a local CDD session 183, as well as other software, information and data as described herein.

The client device 170 initiates a CDD session 128 with a CDD 110. For example, a request to initiate a CDD session may include a user-initiated capture of a CDD image data, or represent an address to a webpage, a link selected by the user, the act of opening an application (e.g., the AR application 178), logging into an airline, hotel, bank, rental car application or website, and the like, while on a shared network 112 with the CDD 110. Among other things, the local browser 124 may maintain a session ID 130 in connection with the local CDD session 128. The one or more processors of the client device 170 may identify the host application (e.g., RMA 134) maintained on the CDD 110 by registering, for example and without limitation, one or more of a service set identifier (SSID), a radio frequency identifier (RFID), a near field sensor, metadata, a two- or three-dimensional image associated with the RMA 134, or portion thereof, using computer vision, and the like.

In one implementation, the client device 170 captures CDD image data indicative of an image presented on the display 118 of the CDD 110. The image presented on the display 118 of the CDD 110 may be the first content screen that displays an introductory (or public) content view. The introductory content view may contain one or more of introductory maps, room location infographics, menus, lists, schedules, advertisements, resources, and the like. The one or more processors 174 of the client device 170 display the CDD image data, representative of the first content screen, on the display 172 of the client device 170. The one or more processors 174 of the client device, utilizing the AR application 178, process the CDD image data to determine interactive regions associated with the introductory content view of the first content screen displayed on the CDD 110. For example, an introductory map of conference rooms of a building presented on the display 172 is processed, by the AR application 178, to determine an interactive region (e.g., a conference room footprint) associated with each conference room of the introductory map of conference rooms of the building. In another example, an introductory restaurant menu presented on the display 172 is processed, by the AR application 178, to determine an interactive region associated with each menu item on the menu. The one or more processors 174 of the client device 170 identify a user-based selection, in the form of touch, proximity sensing, gesture, computer vision, or the like, and generate an instruction in response to the user-based selection. Optionally, the one or more processors 174 of the client device 170 may update the display 172 to a second or subsequent content screen in response to the user-based selection. The one or more processors 174 of the client device 170 generate instructions representing requests to designate available resources from a collection of resources based on the user-based selection. For example, the instruction may be a request to designate an available conference room at a selected available time or to designate a specific menu item for order. The one or more processors 174 transmit the instruction to the one or more processors 114 of the CDD 110.

In an additional or alternative implementation, the one or more processors 174 of the client device 170 provide unique credentials to one or more of the AR application 178 and the one or more processors 104 of the CDD 110. The unique credentials may be provided by a user of the client device 170 logging in to the AR application 178, or, automatically, by the client device 170 coming within a select range (e.g., Wi-Fi range, or the like) of the CDD 110, or otherwise registering the CDD 110 via, for example, an SSID, an RFID, a near field sensor, a two- or three-dimensional image captured by a the DCU 180 of the client device 170, and the like. The unique credentials may include one or more of a user ID, a user name, a user password, a device ID, and the like. The CDD 110, based on the unique credentials, transmits a data set that corresponds to a select group of one or more users that includes the client device 170 and the user of the client device. Additionally or alternatively, the data set is selected, based on the unique credentials, from an aggregate data set accessible to the AR application 178 native to the client device 170. The client device 170 receives the data set and overlays user-specific content on the CDD image data displayed on the display 172 of the client device 170. For example, the data set corresponding to the select group of one or more users may correspond to a subset of the conference rooms, of the introductory map of conference rooms of the building, available to and/or dedicated to a subgroup (e.g., a team, department, access level, and the like) to which the user belongs. In another example, the data set corresponding to the select group of one or more users may correspond to a subset of the menu items, of the introductory menu, corresponding to a set of dietary requirements and/or restrictions. The one or more processors 174 of the client device 170 overlay the user-specific content on the CDD image data and identify a user-based selection, in the form of touch, proximity sensing, gesture, computer vision, or the like, and generate an instruction in response to the user-based selection. Optionally, the one or more processors 174 of the client device 170 may update the display 172 to a second or subsequent content screen in response to the user-based selection. The one or more processors 174 of the client device 170 may generate an instruction representing a request to designate an available resource from a collection of resources specific to the user and/or device based on the user-based selection. For example, the instruction may be a request to designate, from a specific set of conference rooms available to the user, an available conference room at a selected available time or to designate a specific menu item, based on attributes assigned to the specific user related to dietary requirements and/or restrictions, for order. The one or more processors 174 of the client device 170 transmit the instruction to the one or more processors 114 of the CDD 110.

In an additional or alternative implementation, the one or more processors 174 of the client device 170 identify the host application (e.g., the RMA 134) maintained on the CDD 110. The client device 170 registers the host application by sensing, for example and without limitation, an SSID, an RFID, a near field sensor, a two- or three-dimensional image captured by a the DCU 180 of the client device 170, and the like. The client device 170 implements a client application (e.g., AR application 178) in response to registration of the host application. The AR application 178 is capable of receiving and processing the specific instructions that define the framework for the collection of content screens 136 for designating the resources and the data set 138 that tracks designations of the resources transmitted by the CDD 110. The one or more processors of the client device 170 receive a data set 138 transmitted from the CDD 110 designating resources reserved by one or more client devices 170 and/or users associated with the CDD 110. The data set 138 may correspond to the select group of one or more users that includes the user of the client device 170. For example, the data set 138 may include a list of available rooms specific to the user and the times at which the available rooms are reserved other users. or a list of menu items available to a user and the quantities and/or times at which the menu items can be provided to the user. The AR application 178 overlays information represented in the data set on the CDD image data displayed on the display 172 of the client device 170. The one or more processors 174 of the client device 170 overlay the user-specific content on the CDD image data and identify a user-based selection, in the form of touch, proximity sensing, gesture, computer vision, or the like, and generate an instruction in response to the user-based selection. Optionally, the one or more processors 174 of the client device 170 may update the display 172 to a second or subsequent content screen in response to the user-based selection. The one or more processors 174 of the client device 170 may generate an instruction representing a request to designate an available resource from a collection of resources specific to the user and/or device based on the user-based selection. For example, the instruction may be a request to designate, from a specific set of conference rooms available based on the resource designations of other users, an available conference room at a selected available time or to designate a specific menu item, based on attributes assigned to the specific user related to dietary requirements and/or restrictions, for order. The one or more processors 174 transmit the instruction to the one or more processors 114 of the CDD 110.

A more detailed implementation of processes for augmenting a communal display device are described hereafter.

Processes for Augmenting a CDD

Figure 2:
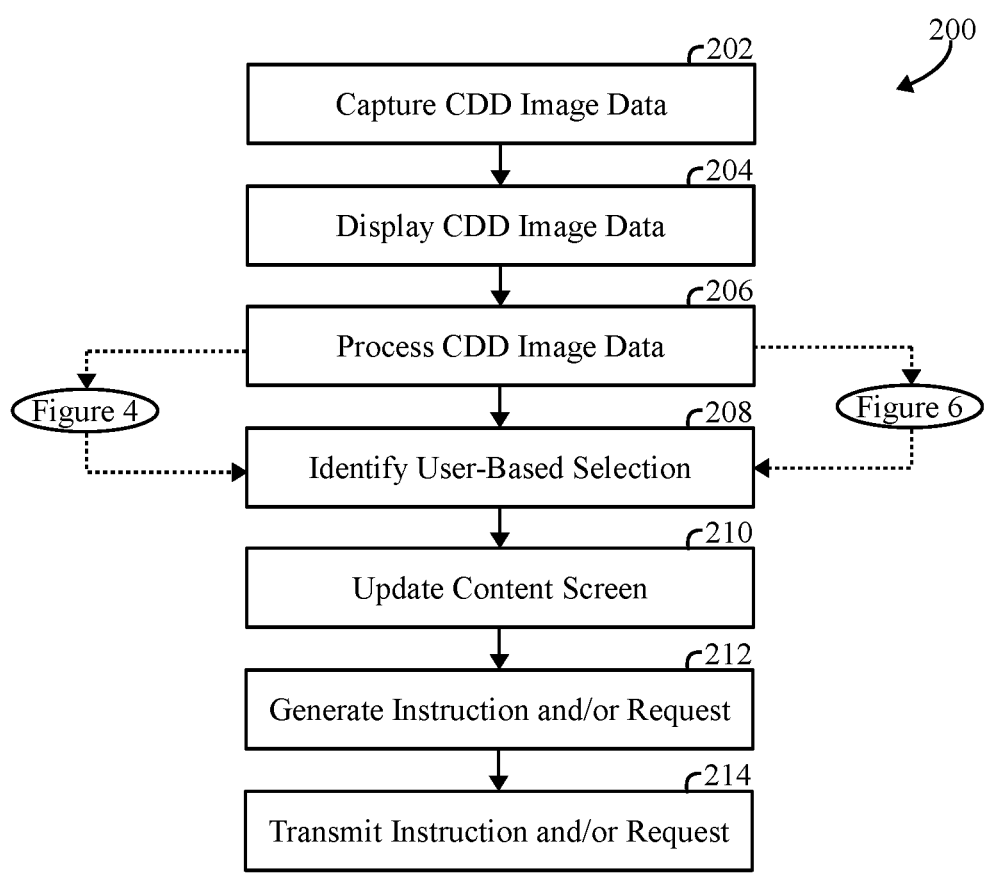
FIG. 2 illustrates an exemplary processes carried out by a client device in accordance with embodiments herein.
Figure 4:
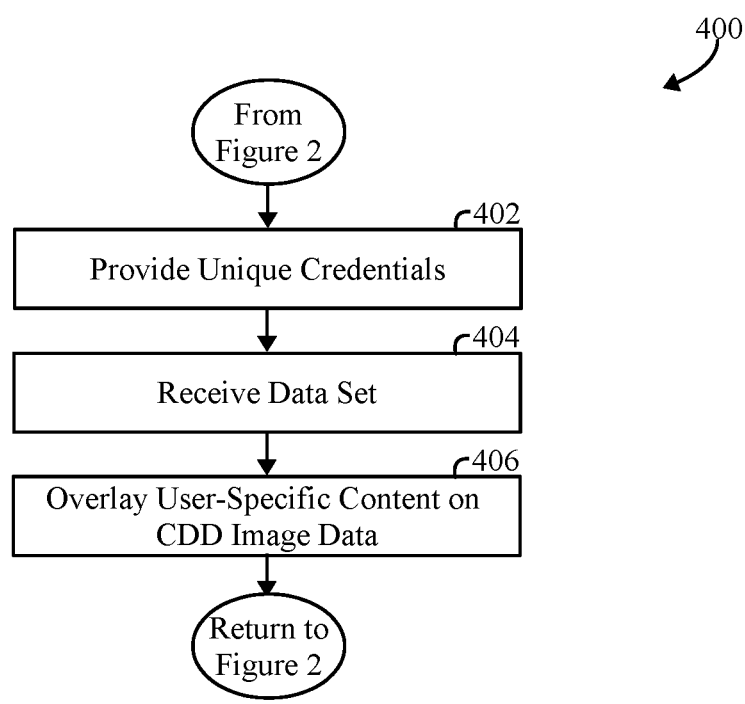
FIG. 4 illustrates an exemplary processes carried out by a client device in accordance with embodiments herein.
Figure 6:
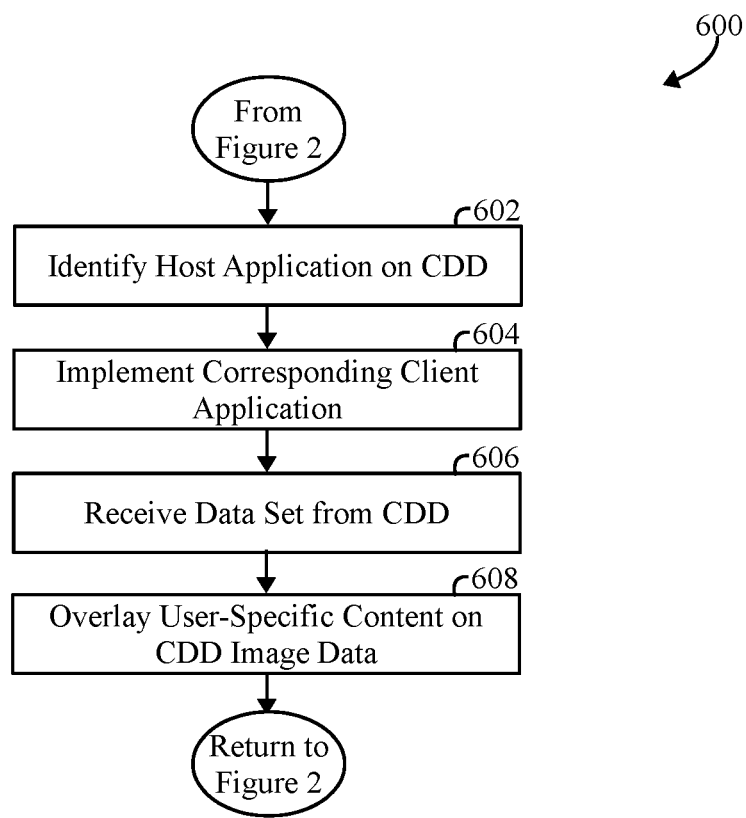
FIG. 6 illustrates an exemplary processes carried out by a client device in accordance with embodiments herein.

FIGS. 2, 4 and 6 illustrate processes for augmenting a CDD in accordance with embodiments herein. The operations of FIGS. 2, 4, and 6 are carried out by one or more processors in FIG. 1 in response to execution of program instructions, such as in the AR application 178, the RMA 134, and/or other application stored in the memory 176 of the client device 170, the memory 116 of the CDD 110, and/or the memory 106 of the resource manager 102, when the CDD 110 and the client device 170 are connected to the shared network 112. For the sake of clarity, the operations of FIGS. 2, 4, and 6 will be described in connection with one request (or instruction), however it is recognized that a CDD 110 and client device 170 may provide multiple requests in connection with augmenting a CDD. Optionally, the operations of FIGS. 2, 4 and 6 may be performed upon select requests from a client device 170, upon every request from a client device 170, upon groups of requests from a client device 170, or otherwise. Optionally, the operations of FIGS. 2, 4 and 6 may be performed in parallel for multiple client devices 170 and/or multiple CDDs 110.

FIG. 2 illustrates a process 200 for augmenting a CDD 110 that enables one or more users to interact with a CDD 110 at the same time, via their respective client devices, while the CDD 110 maintains a first content screen displaying an introductory (or public) content view.

At 202, the one or more processors of the client device 170, under control of a user, capture CDD image data at the DCU 180. The CDD image data may include photographs and/or video recordings captured by the DCU 180 under user control. The CDD image data is indicative of an image presented on the display 118 of the CDD 110. The image presented on the display 118 of the CDD 110 may be a first content screen. The first content screen may display an introductory (or public) content view. The introductory content view is not specific to any client device 170 and/or any user of the client device 170. The introductory content view includes one or more interactive regions organized in a select layout. The introductory content view may contain introductory maps, room location infographics, menus, lists, schedules, advertisements, resources, and the like. For example, the user may walk up to the display 118 of the CDD 110, direct the DCU 180 of the client device 170 towards the display 118 (e.g., an introductory map of conference rooms of a building or a restaurant menu) of the CDD 110, and enter a command at the user interface 184 of the client device 170 directing the DCU 180 to capture CDD image data. Once the CDD image data is captured, flow moves to 204.

At 204, the one or more processors of the client device 170 display the CDD image data on the display 172 of the client device 170. The displaying may include presenting, as the CDD image data, the introductory content view of the first content screen. For example, the introductory map of conference rooms of a building or the restaurant menu may be presented on the display 172 of the client device 170. Once the CDD image data is displayed, flow moves to 206.

At 206, the one or more processors of the client device 170 process the CDD image data to determine interactive regions associated with the introductory content view of the first content screen displayed by the CDD 110. The AR application 178 of the client device 170 processes the CDD image data (e.g., using computer vision capability embedded in the AR application 178) to determine the interactive regions associated with the introductory content view of the first content screen. For example, the introductory map of conference rooms of a building presented on the display 172 is processed, by the AR application 178, to determine an interactive region (e.g., a conference room footprint) associated with each conference room of the introductory map of conference rooms of the building. In another example, the introductory restaurant menu presented on the display 172 is processed, by the AR application 178, to determine an interactive region associated with each menu item on the menu. Optionally, once the interactive regions associated with the introductory content view of the first content screen are determined, flow may move to 208.

At 208, the one or more processors of the client device 170 identify a user-based selection. The user-based selection, associated with one or more of the interactive regions, may be identified based on one or more of touch, proximity sensing, gesture, and computer vision. Once the user-based selection is identified, flow moves to 210.

At 210, the one or more processors of the client device 170 update the display 172 of the client device 170 to display a second content screen in response to the user-based selection. The CDD 110 maintains the first content screen common to all users, while the display 172 of the client device 170 displays the second content screen. The second content screen may contain secondary content related to interactive regions associated with the first content screen. For example, the second content screen may contain content related to interactive regions associated with elements of the introductory maps, room location infographics, menus, lists, schedules, advertisements, resources, and the like. For example, the second content screen associated with an interactive region corresponding to a specific conference room may contain information regarding times the conference room is available, the seating capacity of the conference room, and other resources tied to the conference room, such as communication-related resources. In another example, the second content screen associated with an interactive region corresponding to a specific menu item of an introductory menu may contain nutrition information and options for customizing the specific menu item that are associated with interactive regions on the second content screen. Once the display is updated, flow moves to 212.

At 212, the one or more processors of the client device 170 generate an instruction in response to the user-based selection of one or more of the interactive regions. The instruction represents a request to designate an available resource from the resources. Generating an instruction may include utilizing one or more of the client application (e.g., the AR application 178), the data set 138, and the user-based selection to generate the request to designate an available resource. For example, the instruction may be a request to designate an available conference room at a selected available time. In another example, the instruction may be a request to designate a specific menu item, with or without further customization, for order. Once the instruction is generated, flow moves to 214.

At 214, the one or more processors of the client device 170 transmit the instruction to the one or more processors of the CDD 110.

Figure 3:
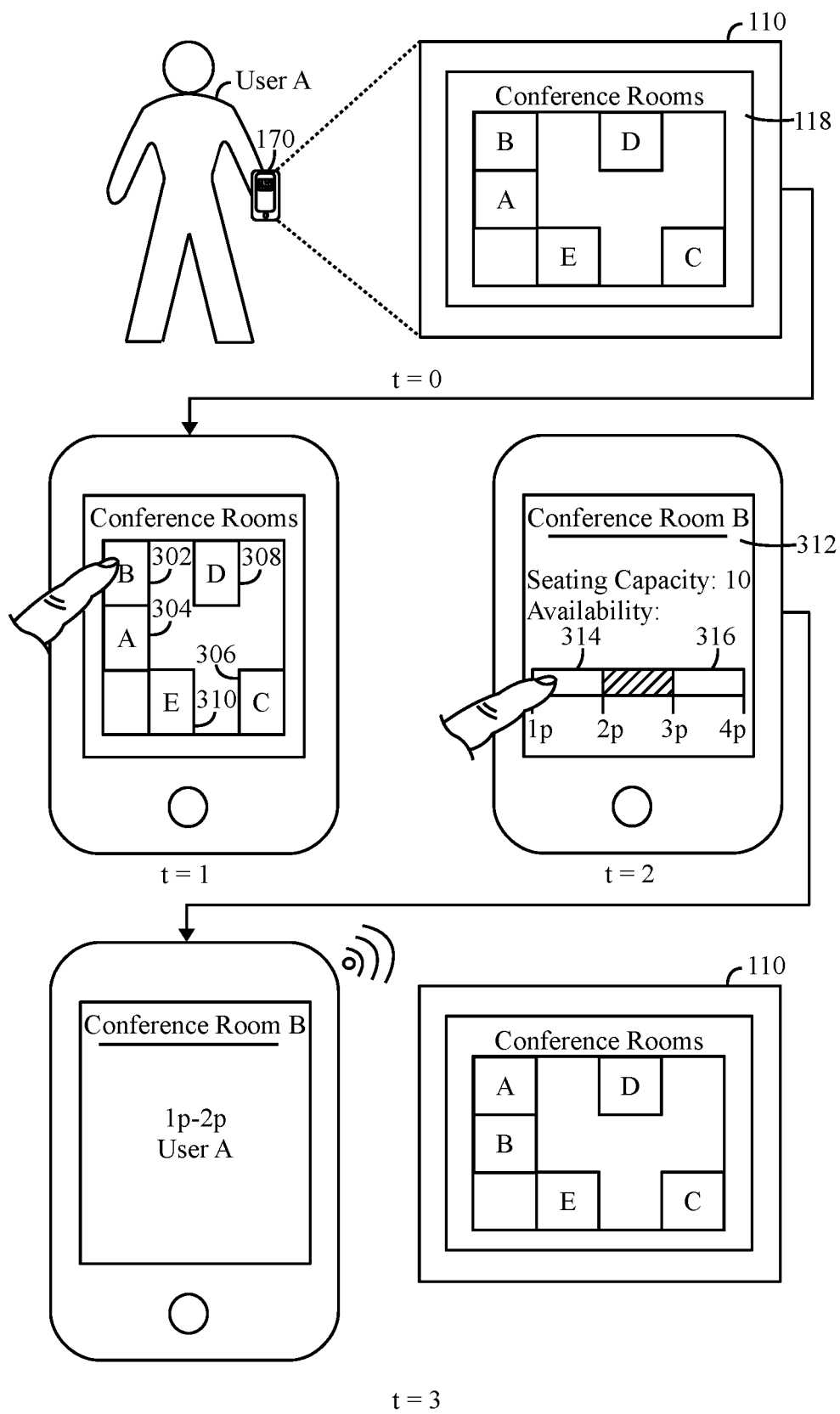
FIG. 3 illustrates an example implementation of the process of FIG. 2 in accordance with embodiments herein.

FIG. 3 illustrates an example implementation of the process of FIG. 2 in accordance with embodiments herein. At time t=0, the one or more processors of the client device 170, under control of User A, capture, display, and process CDD image data indicative of an image presented on the display 118 of the CDD 110 as described in operations 202, 204, and 206 of FIG. 2. Subsequent to operation 206, the CDD image data is displayed on the client device 170 and overlaid with interactive regions 302, 304, 306, 308, 310 associated with the introductory content view of the first content screen displayed by the CDD. At time t=1, the one or more processors of the client device 170 identify the user-based selection of interactive region 302, associated with Conference Room B, based on User A touching the interactive region 302 as described in operation 208 of FIG. 2. At time t=2, the one or more processors of the client device 170, responsive to the user-based selection of interactive region 302, updates the display 172 of the client device 170 to show a second content screen 312 as described in operation 210 of FIG. 2. The second content screen 312 contains additional information about Conference Room B, including seating capacity, availability, and the like. The second content screen 312 includes additional interactive regions (e.g., an interactive region 314 associated with a first available time corresponding to Conference Room B and a second interactive region 316 associated with a second available time corresponding to Conference Room B). User A may make a second user-based selection associated with the second content screen such as, for example, selecting the interactive region 314 associated with the first available time corresponding to the Conference Room B. At time t=3, based on one or more of the user-based selections, the one or more processors of the client device 170 generate and transmit an instruction to the one or more processors of the CDD 110 as described in operations 212 and 214 of FIG. 2. The instruction represents, for example, a request to designate Conference Room B at a selected available time.

FIG. 4 illustrates an additional or alternative process 400 for augmenting a CDD in accordance with embodiments herein. The process for augmenting a CDD 110 enables one or more users to interact with a CDD 110 at the same time, via their respective client devices and unique credentials, while the CDD 110 maintains a first content screen displaying an introductory (or public) content view. Returning to 206 of FIG. 2, additionally or alternatively, once the interactive regions associated with the introductory content view of the first content screen are determined, flow may move to 402.

At 402, the one or more processors of the client device 170 provide unique credentials associated with the client device 170 or a user of the client device 170. The unique credentials may be provided to the AR application 178 and/or the one or more processors of the CDD 110. The unique credentials may be provided to the AR application native to the client device 170 by the user logging in to the AR application 178 (e.g., by entering a user name and user password). Additionally or alternatively, the unique credentials may be provided by the client device 170 automatically transmitting the unique credentials to the CDD 110 when the client device 170 comes within a select range (e.g., a Wi-Fi range or the like) of the CDD 110 and/or registers the CDD 110 via, for example and without limitation, an SSID, an RFID, a near field sensor, a two- or three-dimensional image of the CDD 110, or portion thereof, using computer vision, and the like. Additionally or alternatively, the unique credentials may be provided, upon the CDD image data capture, the user entering initial registration information associated with one or more of the AR application 178 and the RMA 134 of the CDD 110, the client device 170 transmitting the instruction containing the initial registration information to the CDD 110. The CDD 110 receives the instruction from the client device 170 and pairs the instruction with unique credentials. The unique credentials may include one or more of a user ID, a user name, a user password, a device ID, or the like. Once the unique credentials are provided, flow moves to 404.

At 404, the client device 170 receives a data set that corresponds to a select group of one or more users that includes the one or more client device and the user of the client device, based on the unique credentials. The data set is transmitted to the client device 170 by the CDD 110 or selected, based on the unique credentials, from an aggregate data set accessible to the AR application 178 native to the client device 170. For example, the data set corresponding to the select group of one or more users may correspond to a subset of the conference rooms, of the introductory map of conference rooms of the building, available to and/or dedicated to a subgroup (e.g., a team, department, access level, and the like) to which the user belongs. In another example, the data set corresponding to the select group of one or more users may correspond to a subset of the menu items, of the introductory menu, corresponding to a set of dietary requirements and/or restrictions. Once the data set corresponding to the select group is received, flow moves to 406.

At 406, the one or more processors of the client device 170 overlay, on the CDD image data, user-specific content related to the data set corresponding to the select group of one or more users. The AR application 178 may process the data set corresponding to the select group of one or more users and, based thereon, generate the user-specific content overlaid on the CDD image data. For example, the data set corresponding to the subset of the conference rooms available to and/or dedicated to the subgroup to which the user belongs may be processed, by the AR application 178, to generate and overlay user-specific content. The user specific content may be a layer that highlights (e.g., visually) the interactive regions (e.g., the conference room footprints) associated with the subset of the conference rooms available to and/or dedicated to the subgroup to which the user belongs. Additionally or alternatively, the user specific content may be a layer that mutes and/or hides the interactive regions (e.g., the conference room footprints) that are not associated with the subset of the conference rooms available to and/or dedicated to the subgroup to which the user belongs. In another example, the data set corresponding to the set of dietary requirements and/or restrictions for the user may be processed, by the AR application 178, to generate and overlay user-specific content. The user specific content may be a layer that highlights (e.g., visually) the interactive regions (e.g., the menu items) associated with the subset of the menu items corresponding to the set of dietary requirements and/or restrictions. Additionally or alternatively, the user specific content may be a layer that mutes and/or hides the interactive regions (e.g., the menu items) associated with the subset of the menu items corresponding to the set of dietary requirements and/or restrictions. Once the user-specific content is overlaid on the CDD image data, flow moves to 208 of FIG. 2.

Figure 5:
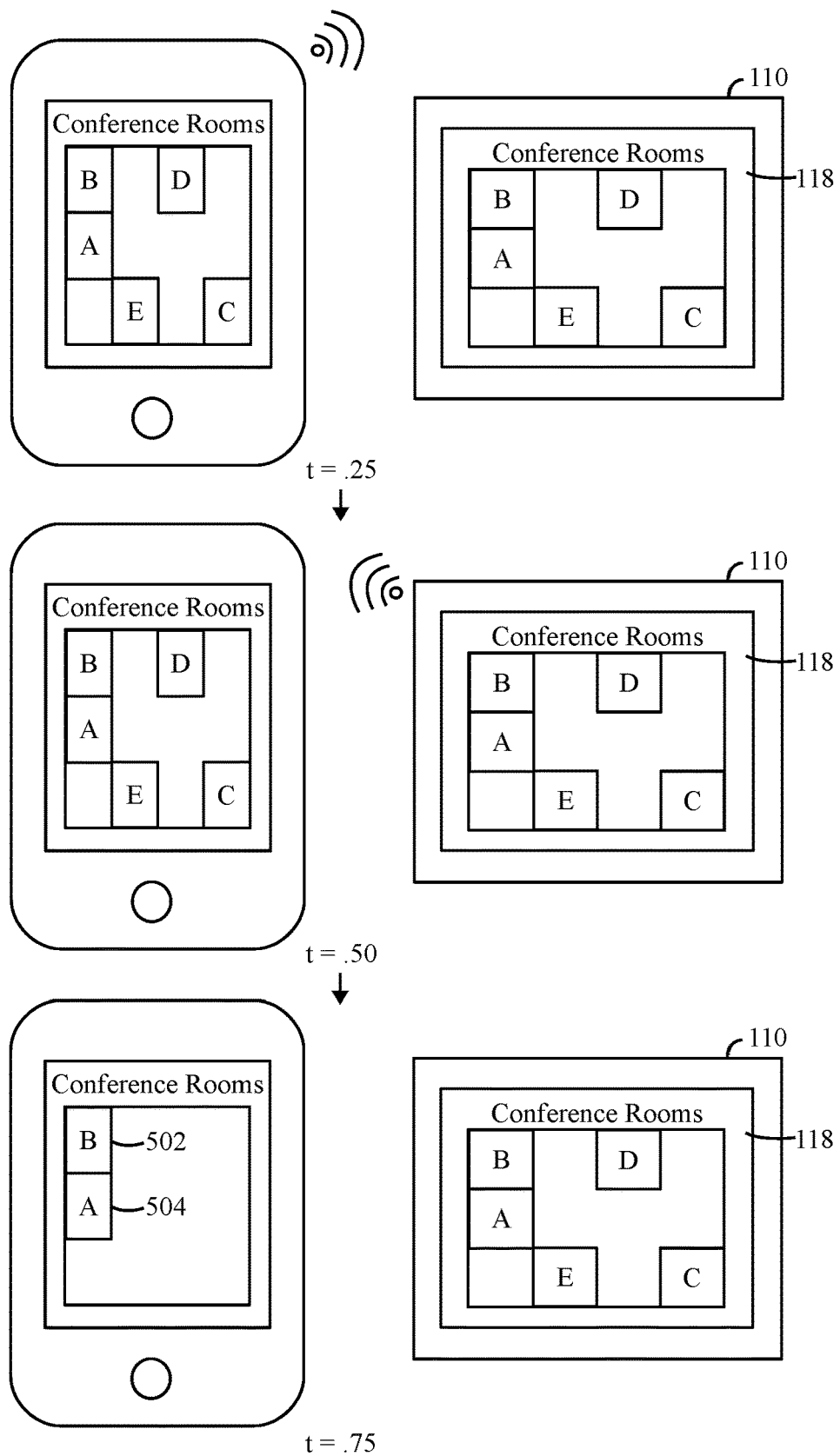
FIG. 5 illustrates an example implementation of the process of FIG. 4 in accordance with embodiments herein.

FIG. 5 illustrates an example implementation of the process of FIG. 4 in accordance with embodiments herein. At time t=0.25, the one or more processors of the client device 170 provide unique credentials associated with one or more of the client device 170 and the user associated with the client device to one or more of the AR application 178 native to the client device 170 and the one or more processors of the CDD 170 as described in operation 402 of FIG. 4. The unique credentials may include, for example and without limitation, a user ID, a user name, a user password, a device ID or the like. The one or more processors of the CDD 110 and/or the AR application 178 native to the client device pair the unique credentials with a data set that corresponds to a select group of one or more users that includes the client device 170 and/or the user of the client device. The data set corresponds to, for example, a subset of the conference rooms available to and/or dedicated to a subgroup (e.g., a team, department, access level, or the like) which the user is associated with. At time t=0.50, the one or more processors of the client device 170 receive the data set that corresponds to the select group of one or more users that includes the client device 170 and/or the user of the client device as described in operation 404 of FIG. 4. The one or more processors of the client device 170 overlay, on the CDD image data, the user-specific content related to the data set corresponding to the select group of one or more users that includes the client device 170 and/or the user of the client device as described in operation 406 of FIG. 4. For example, based on the organizational associations assigned to the user, only Conference Room A and Conference Room B are available to the user. Accordingly, the display 172 of the CDD image data on the client device 170 is updated to mute or hide the interactive regions corresponding to any conference rooms that are not associated with Conference Room A (e.g., interactive region 504) and Conference Room B (e.g., interactive region 502).

FIG. 6 illustrates an additional or alternative process 600 for augmenting a CDD in accordance with embodiments herein. The process for augmenting a CDD 110 enables one or more users to interact with a CDD 110 at the same time, via their respective client devices and upon implementing a client application corresponding to a host application native to the CDD 110, while the CDD 110 maintains a first content screen displaying an introductory (or public) content view. Returning to 206, additionally or alternatively, once the interactive regions associated with the introductory content view of the first content screen are determined at operation 206 of FIG. 2, flow may move to 602.

At 602, the one or more processors of the client device 170 identify the host application maintained on the CDD 110. The CDD 110 implements and maintains a host application for managing resources (e.g., RMA 134). The RMA 134 includes specific instructions that define a framework for a collection of content screens 136 for designating the resources and maintains a data set 138 that tracks designations of the resources by one or more client devices 170 and/or users associated with the CDD 110. The one or more processors of the client device 170 identify the host application (e.g., RMA 134) maintained on the CDD 110 by registering, for example and without limitation, one or more of an SSID, an RFID, a near field sensor, metadata, a two- or three-dimensional image associated with the RMA 134, or portion thereof, using computer vision, and the like. Once the host application is identified, flow moves to 604.

At 604, the one or more processors of the client device 170 implement a client application corresponding to the host application maintained on the CDD 110. The client device 170 may implement, as the client application, the AR application 178. The AR application 178 is capable of receiving and processing at least the specific instructions that define the framework for the collection of content screens 136 for designating the resources and the data set 138 that tracks designations of the resources transmitted by the CDD 110. Once the client device implements the client application corresponding to the host application, flow moves to 606.

At 606, the one or more processors of the client device 170 receives the data set 138 transmitted from the CDD 110 designating resources reserved by one or more client devices 170 and/or users associated with the CDD 110. The data set 138 may correspond to the select group of one or more users that includes the user of the client device 170. For example, the data set 138 may include a list of available rooms specific to the user and the times at which the available rooms are reserved other users. In another example, the data set 138 may include a list of menu items available to a user and the quantities and/or times at which the menu items can be provided to the user. Once the data set 138 is received, flow moves to 608.

At 608, the one or more processors of the client device 170 overlay, on the CDD image data, user-specific content related to the data set corresponding to the select group of one or more users. The AR application 178 may process the data set corresponding to the select group of one or more users and, based thereon, generate the user-specific content overlaid on the CDD image data. For example, the data set corresponding to the subset of the conference rooms available to and/or dedicated to the subgroup to which the user belongs may be processed, by the AR application 178, to generate and overlay user-specific content. The user specific content may be a layer that highlights (e.g., visually) the interactive regions (e.g., the conference room footprints) associated with the subset of the conference rooms available to and/or dedicated to the subgroup to which the user belongs. Additionally or alternatively, the user specific content may be a layer that mutes and/or hides the interactive regions (e.g., the conference room footprints) that are not associated with the subset of the conference rooms available to and/or dedicated to the subgroup to which the user belongs. In another example, the data set corresponding to the set of dietary requirements and/or restrictions for the user may be processed, by the AR application 178, to generate and overlay user-specific content. The user specific content may be a layer that highlights (e.g., visually) the interactive regions (e.g., the menu items) associated with the subset of the menu items corresponding to the set of dietary requirements and/or restrictions. Additionally or alternatively, the user specific content may be a layer that mutes and/or hides the interactive regions (e.g., the menu items) associated with the subset of the menu items corresponding to the set of dietary requirements and/or restrictions. Once the user-specific content is overlaid on the CDD image data, flow moves to 208 of FIG. 2.

Figure 7:
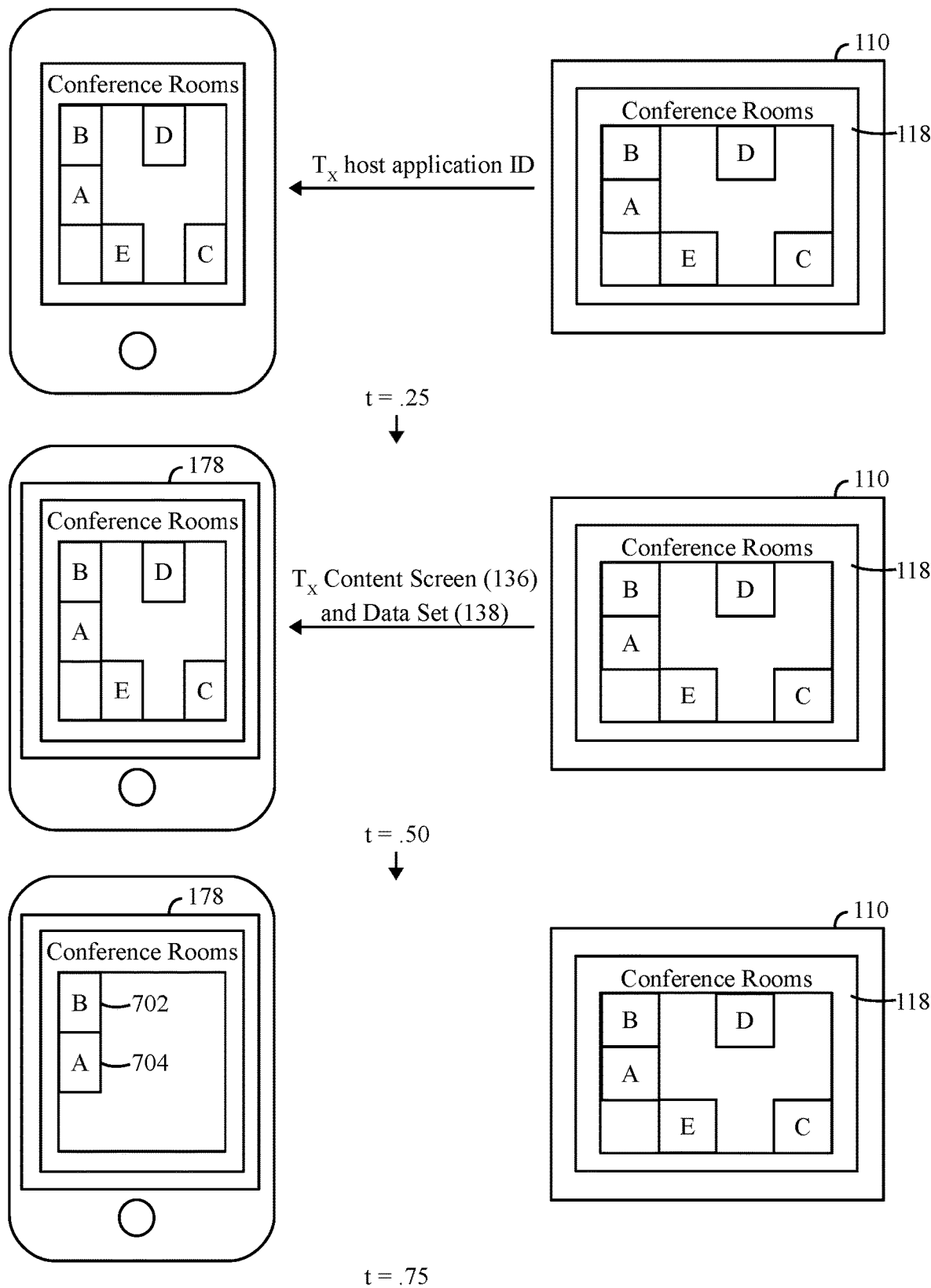
FIG. 7 illustrates an example implementation of the process of FIG. 6 in accordance with embodiments herein.

FIG. 7 illustrates an example implementation of the process of FIG. 6 in accordance with embodiments herein. At time t=0.25, the one or more processors of the client device 170 identify a host application (e.g., the RMA 134) maintained on the CDD 110 and implement a client application (e.g., AR application 178) corresponding to the host application as described in operations 602 and 604 of FIG. 6. For example, the one or more processors of the CDD 110 transmits an SSID, RFID, metadata, or the like corresponding to RMA 134. The one or more processors of the client device 170 registers the SSID, RFID, metadata or the like corresponding to RMA 134 and implements AR application 178 in response. The AR application 178 receives and processes at least the specific instructions that define the framework for the collection of content screens 136 for designating the resources and the data set 138 that tracks designation of the resources transmitted by the CDD 110. The data set 138 corresponds to, for example, a subset of the conference rooms available to and/or dedicated to a subgroup (e.g., a team, department, access level, or the like) which the user is associated with. At time t=0.50, the one or more processors of the client device 170 receive the specific instructions that define the framework for the collection of content screens 136 for designating the resources and the data set 138 that tracks designation of the resources as described in operation 606 of FIG. 6. The one or more processors of the client device 170 overlay, on the CDD image data, the user-specific content related to the collection of content screens 136 for designating the resources and the data set 138 that tracks designation of the resources as described in operation 608 of FIG. 6. For example, based on the organizational associations assigned to the user, only Conference Room A and Conference Room B are available to the user, and only at select times. Accordingly, the display 172 of the CDD image data of the first content screen on the client device 170 is updated to mute or hide the interactive regions corresponding to conferences rooms that are not associated with Conference Room A (e.g., interactive region 704) and Conference Room B (e.g., interactive region 702). Accordingly, only the interactive regions 702, 704, corresponding to Conference Rooms A and B, remain for selection by the user on the display of the client device 170. Furthermore, the one or more processors of the client device, via the AR application 178, may implement additional content screens, accessible by user-based selection of interactive regions 702, 704, in the collection of content screens 136 for designating the available conference rooms (e.g., Conference Rooms A and B), as well as displaying the availability of the Conference Rooms A and B, via data set 138.

CLOSING STATEMENTS

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming.

The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B. For the avoidance of doubt, the claim limitation "associated with one or more of the client device and a user of the client device" means and shall encompass i) "associated with the client device", ii) "associated with a user of the client device" and/or iii) "associated with both the client device and a user of the client device". For the avoidance of doubt, the claim limitation "one or more of touch, proximity sensing, gesture or computer vision" means and shall encompass i) "touch", ii) "proximity", (iii) "sensing", (iv) "gesture", and/or (iv) "computer vision" and any sub combination thereof.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method for augmenting a communal display device (CDD) that implements a host application that defines content screens for managing and designating physical resources, the method comprising:
under control of one or more processors configured with specific executable program instructions:
capturing CDD image data at a digital camera unit (DCU) of a client device, the CDD image data indicative of a first content screen presented on the CDD;
displaying the first content screen corresponding to the CDD image data on a display of the client device;
processing the CDD image data to determine interactive regions of the first content screen presented on the client device;
receiving a user-based selection on the client device of at least one of the interactive regions displayed on the client device;
in response to the user-based selection, updating the display of the client device to display a second content screen from the content screens; and
repeating the receiving and updating to generate, at the client device, a request to reserve an available physical resource from the physical resources, while maintaining the first content screen on the CDD.

2. The method of claim 1, further comprising identifying the user-based selection based on one or more of touch, proximity sensing, gesture or computer vision.

3. The method of claim 1, the method further comprising updating the display of the client device to display multiple content screens, from the content screens, in response to corresponding user-based selections to allow the client device to interact with the CDD while maintaining the first content screen displayed on the CDD.

4. The method of claim 1, further comprising:
providing unique credentials associated with one or more of the client device and a user of the client device; and
receiving a data set that corresponds to a select group of one or more users that includes the one or more of the client device and the user of the client device, based on the unique credentials.

5. The method of claim 1, further comprising:
implementing, on the client device, a client application correspond to the host application maintained on the CDD to manage resources;
receiving, at the client device, a data set transmitted from the CDD, the data set designating physical resources reserved by other client devices; and
utilizing the client application, data set and user-based selection to generate the request to reserve the available physical resource from the physical resources separate from the physical resources reserved by the other client devices; and
transmitting the request to the one or more processors associated with the CDD.

6. The method of claim 5, wherein the data set corresponds to a select group of one or more users that includes a user of the client device, wherein the first content screen represents an introductory or public content view for the select group of one or more users.

7. The method of claim 1, wherein the CDD maintains a data set that tracks designations of the physical resources by other client devices.

8. The method of claim 1, further comprising overlaying, on the CDD image data, user specific content that is determined based on a user unique identifier.

9. The method of claim 1, wherein the capturing, displaying, processing, generating, and transmitting are performed in parallel for at least first and second client devices in connection with different first and second user-based selections, the method further comprising updating the displays of the first and second client devices independently to display separate corresponding content screens in response to corresponding first and second user-based selections to allow the first and second client devices to interact with the CDD at a same time while maintaining the first content screen displayed on the CDD.

10. A computer implemented method for augmenting a communal display device (CDD), the method comprising:
under control of one or more processors configured with specific executable program instructions:
identifying a host application maintained on a CDD to manage physical resources, the host application defining content screens for managing and designating the physical resources;
implementing a client application, at a first client device, correspond to the host application;
receiving, at the first client device, a data set transmitted from the CDD, the data set designating a physical resource reserved by a second client device;
utilizing the client application, data set and user-based selection to generate a request to reserve an available physical resource from the physical resources separate from the physical resource reserved by the second client device; and
transmitting the request to the one or more processors associated with the CDD,
wherein the identifying, implementing, receiving, utilizing, and transmitting are performed in parallel for at least the first and second client devices in connection with different first and second user-based selections to allow the first and second client devices, implementing first and second client applications, to interact with the CDD at a same time while maintaining a public content screen displayed on the CDD.

11. The method of claim 10, wherein the data set corresponds to a select group of one or more users that includes a user of the client device.

12. The method of claim 10, further comprising:
providing unique credentials associated with one or more of the client device and a user of the client device; and
receiving further comprises receiving a data set that corresponds to a select group of one or more users that includes the one or more of the client device and the user of the client device, based on the unique credentials.

13. The method of claim 12, wherein the utilizing further comprises displaying the CDD image data on a display of the client device and overlaying, on the CDD image data, content that is based on the data set that corresponds to the select group of one or more users.

14. The method of claim 10, wherein the utilizing further comprises identifying the user-based selection based on one or more of touch, proximity sensing, gesture or computer vision.

15. The method of claim 10, wherein the identifying, implementing, receiving, utilizing, and transmitting are performed in parallel for at least first and second client devices in connection with different first and second user-based selections.

16. A device for augmenting a communal display device (CDD) that implements a host application that defines content screens for managing and designating physical resources, the device comprising:
one or more processors;
a digital camera unit (DCU);
a display;
memory storing program instructions accessible by the one or more processors, wherein, responsive to execution of the program instructions, the one or more processors:
perform an image capture operation to capture CDD image data at the DCU in response to a user-based image capture instruction, the CDD image data indicative of a first content screen presented on the CDD;
process the CDD image data to determine interactive regions of the first content screen presented on the client device;
display the first content screen on the display;
generate an instruction in response to a user-based selection of at least one of the interactive regions; and
transmit the instruction to one or more processors associated with the CDD,
wherein the CDD image data is processed, the first content screen is displayed, and the instruction is generated, at the device through an augmented reality interaction to allow the device to interact with the CDD to request to reserve an available physical resource from the physical resources, without changing the first content screen presented on the CDD.

17. The device of claim 16, wherein the one or more processors are further configured to identify the user-based selection based on one or more of touch, proximity sensing, gesture, or computer vision.

18. The device of claim 16, wherein the one or more processors are further configured to update the display to step through a collection of content screens, displayed on the display, for designating physical resources in response to the user-based selection independent of the first content screen displayed at the CDD.

19. The device of claim 16, wherein the one or more processors are further configured to transmit unique credentials associated with one or more of the device or a user of the device and, based thereon, receive a data set that corresponds to a select group of one or more users that includes one or more of the device or a user of the device.

20. The device of claim 16, wherein the one or more processors are further configured to:
implement a client application corresponding to a host application maintained on the CDD to manage the physical resources;
receive, at the client device, a data set transmitted from the CDD, the data set designating physical resources reserved by other clients; and
utilize the client application, data set and user-based selection to generate the request to reserve the available physical resource from the physical resources; and
transmit the request to the one or more processors associated with the CDD.

* * * * *